(12) United States Patent
McElveen

(10) Patent No.: US 11,138,152 B2
(45) Date of Patent: Oct. 5, 2021

(54) METHOD AND SYSTEM FOR CONTENT AGNOSTIC FILE INDEXING

(71) Applicant: Lognovations Holdings, LLC, Tampa, FL (US)

(72) Inventor: Christopher McElveen, Tampa, FL (US)

(73) Assignee: Lognovations Holdings, LLC, Tampa, FL (US)

(*) Notice: Subject to any disclaimer, the term of this patent is extended or adjusted under 35 U.S.C. 154(b) by 256 days.

(21) Appl. No.: 16/244,332

(22) Filed: Jan. 10, 2019

(65) Prior Publication Data

US 2019/0146950 A1    May 16, 2019

Related U.S. Application Data

(63) Continuation-in-part of application No. 15/730,043, filed on Oct. 11, 2017, now Pat. No. 10,963,429.

(51) Int. Cl.
*G06F 7/02* (2006.01)
*G06F 16/00* (2019.01)
(Continued)

(52) U.S. Cl.
CPC ........ *G06F 16/137* (2019.01); *G06F 16/1744* (2019.01); *G06F 16/2255* (2019.01)

(58) Field of Classification Search
CPC .............. G06F 16/137; G06F 16/2255; G06F 16/1744; G06F 16/1727; G06F 16/2237;
(Continued)

(56) References Cited

U.S. PATENT DOCUMENTS

| 4,168,513 A | 9/1979 | Hains et al. |
| 5,003,597 A | 3/1991 | Merkle |

(Continued)

FOREIGN PATENT DOCUMENTS

| CN | 1977540 A | 6/2007 |
| CN | 107135062 A | 9/2017 |

(Continued)

OTHER PUBLICATIONS

Navarro, Gonzalvo, "A Guided Tour to Approximate String Matching," ACM Computing Surveys, 1999. (Year: 1999).*

(Continued)

*Primary Examiner* — Bruce M Moser
(74) *Attorney, Agent, or Firm* — Brian J. Colandreo; Heath M. Sargeant; Holland & Knight LLP

(57) ABSTRACT

A computer-implemented method for content-agnostic referencing of a binary data file, the method comprising: pregenerating a table of all permutations of data of a particular length, determining a length of the binary data file, the length comprising the number of bits of the binary data file; chunking the binary data into chunks of data of a smaller length; for each chunk, determining if the chunk is in the pregenerated table, and if so using that chunks index in the pregenerated table, and otherwise chunking the data again until the sub-chunks are located in the pregenerated table, and using the number of chunks and associated indices to indicate the binary data file.

20 Claims, 3 Drawing Sheets

(51) Int. Cl.
  *G06F 16/13* (2019.01)
  *G06F 16/174* (2019.01)
  *G06F 16/22* (2019.01)

(58) Field of Classification Search
  CPC ....... H04L 9/065; H04L 69/04; H04L 9/0631; H03M 7/30; H03M 7/60; H03M 7/55
  See application file for complete search history.

(56) References Cited

U.S. PATENT DOCUMENTS

| | | | |
|---|---|---|---|
| 5,442,350 | A | 8/1995 | Iyer et al. |
| 5,486,826 | A | 1/1996 | Remillard |
| 5,594,435 | A | 1/1997 | Remillard |
| 5,673,042 | A | 9/1997 | Yoshida et al. |
| 5,937,183 | A | 8/1999 | Ashar et al. |
| 6,633,244 | B2 | 10/2003 | Avery et al. |
| 6,766,490 | B1 * | 7/2004 | Garrabrant ............... H03M 7/30 714/759 |
| 6,785,889 | B1 | 8/2004 | Williams |
| 7,636,724 | B2 | 12/2009 | de la Torre et al. |
| 7,809,765 | B2 | 10/2010 | Evans et al. |
| 7,868,788 | B2 | 1/2011 | Au et al. |
| RE43,292 | E | 4/2012 | Parker |
| 8,521,540 | B2 | 8/2013 | Burns et al. |
| 9,086,955 | B2 | 7/2015 | Jiang et al. |
| 9,124,295 | B2 | 9/2015 | Dupont |
| 9,275,250 | B2 | 3/2016 | Yoshino et al. |
| 9,331,851 | B2 | 5/2016 | Youn et al. |
| 9,374,220 | B2 | 6/2016 | Youn et al. |
| 10,135,462 | B1 * | 11/2018 | Wallace ............... G06F 11/1453 |
| 10,318,483 | B2 * | 6/2019 | Kataoka ............ G06F 16/90344 |
| 2006/0244639 | A1 | 11/2006 | Parker |
| 2009/0063930 | A1 | 3/2009 | Matsumoto et al. |
| 2009/0319536 | A1 | 12/2009 | Parker |
| 2011/0125727 | A1 | 5/2011 | Zou et al. |
| 2012/0166448 | A1 | 6/2012 | Li et al. |
| 2015/0086013 | A1 | 3/2015 | Metzler et al. |
| 2015/0201043 | A1 | 7/2015 | Sulieman et al. |
| 2017/0192747 | A1 | 7/2017 | Nakamura |
| 2018/0191372 | A1 * | 7/2018 | Marlow ............... H03M 7/3093 |
| 2019/0108237 | A1 | 4/2019 | McElveen |
| 2019/0191372 | A1 * | 6/2019 | Murali .................... H04L 25/02 |

FOREIGN PATENT DOCUMENTS

| | | |
|---|---|---|
| CN | 108667595 A | 10/2018 |
| CN | 108924552 A | 11/2018 |
| CN | 111465929 A | 7/2020 |
| EP | 3695308 A1 | 8/2020 |
| WO | WO2013024230 A2 | 2/2013 |
| WO | WO2017006103 A1 | 1/2017 |
| WO | WO2017064457 A1 | 4/2017 |
| WO | WO2019075175 A1 | 4/2019 |
| WO | WO2020146448 A1 | 7/2020 |

OTHER PUBLICATIONS

Faro, Simone etal, "Efficient Pattern Matching on Binary Strings," Current Trends in Theory and Practice of Computer Science, 2009. (Year: 2009).*

"International Search Report" and "Written Opinion of the International Searching Authority" Patent Cooperation Treaty Application No. PCT/US2020/012661, dated Apr. 21, 2020. 7 pages.

Canteaut, Anne et al., "Stream ciphers: A practical solution for efficient homomorphic-ciphertext compression", Journal of Cryptology 31.3 (2018): 885-916.

Ziv, Jacob et al., "A universal algorithm for sequential data compression", IEEE Transactions on information theory 23.3 (1977): 337-343.

Coron, Jean-Sébastien et al., "Public key compression and modulus switching for fully homomorphic encryption over the integers", Annual International Conference on the Theory and Applications of Cryptographic Techniques, Springer, Berlin, Heidelberg, 2012.

Ohno et al., "A Faster Implementation of Online Run-Length Burrows-Wheeler Transform", Published in IWOCA 2017, Oct. 15, 2017, 8 Pages.

Nicolas, F., "A Simple, Polynomial-Time Algorithm for the Matrix Torsion Problem", Sep. 9, 2009, Available online: <URL:http://arxiv.org/abs/0806.2068v3>, 6 pages.

Burrows-Wheeler Transform, CMSC 423; Lecture notes frp, Carnegie Mellon University School of Computer Science, Nov. 1, 2011, [retrieved on Mar. 9, 2020], Retrieved from the Internet: <URL:https://www.cs.cmu.edu/~ckingsf/bioinfo-lectures/bwt.pdf>, 26 pages.

Weyl, H., "Gravitation and Electricity", Sitzungsber. Preuss. Akad. Berlin (1918) 465, Available online: <URL:http://www.tgeorgiev.net/Gravitation_and_Electricity.pdf>, 14 pages.

Granville, A., "Harald Cramér and the Distribution of Prime Numbers", Scandinavian Actuarial Journal, 1995, No. 1, Available online: <DOI: 10.1080/03461238.1995.10413946>, pp. 12-28.

Chiribella et al., "Informational Derivation of Quantum Theory", A Physical Review vol. 84, Jan. 23, 2011, Jul. 11, 2011 , Available online: <URL: DOI: 10.1103/PhysRevA.84.012311>, 39 pages.

Goswami et al., Naked Singularity Formation in Scalar Field Collapse, Oct. 28, 2004, 4 pages.

Choie et al., "On Nicolas Criterion for the Riemann Hypothesis", Dec. 17, 2010, 8 pages.

Hawking, S., "Properties of Expanding Universes", (Doctoral thesis), University of Cambridge; [online], 1966 [retrieved on Mar. 20, 2018], Retrieved from the Internet: <URL:https://doi.org/10.17863/CAM.11283>, 136 pages.

Miller, G.L., "Riemann's Hypothesis and Tests for Primality", Journal of Computer and System Sciences, Dec. 1976, Available online: <URL:https://doi.org/10.1016/S0022-0000(76)80043-8>, 2 pages.

Maynard, J., "Small Gaps Between Primes", Nov. 20, 2013, 23 pages.

Hasanalizade, E., "The Goldston-Pintz-Yildirim Sieve and Some Applications", Master's Thesis in Mathematics at KTH Royal Institute of Technology, Dec. 14, 2012, 44 pages.

Berndt et al., "The Life and Work of R.A. Rankin (1915-2001)",The Ramanujan Journal vol. 7, 9-38, Mar. 2003, Available online: <URL:https://doi.org/10.1023/A:1026214305402>, 23 pages.

Deorowicz, S., "Universal Lossless Data Compression Algorithms", Philosopy Dissertationn Thesis, Silesian University of Technology, Faculty of Automatic Control, Electronics and Computer Scient, Institute of Computer Science, Gliwice, 2003, 214 pages.

Chang, Y., "Various Decays of Particles, Universal Decay Formulas and Their Possible Dynamic Basis and Applications", Yunnan University, China, Jul. 2010, 18 pages.

Sedgewick, R., "Permutation Generation Methods", Princeton University, [online], [retrieved on Mar. 20, 2018] Available online: <URL:https://www.cs.princeton.edu/~rs/talks/perms.pdf>, 21 pages.

Ziv et al., "A Universal Algorithm for Sequential Data Compression", IEEE Transactions on Information Theory, vol. 23, Issue 3, May 1977, Available online:<URL:https://www2.cs.duke.edu/courses/spring03/cps296.5/papers/ziv_lempel_1977_universal_algorithm.pdf>, pp. 337-343.

Rissanen, J, "A Universal Data Compression System", IEEE Transactions on Information Theory, vol. 29, Issue 5 , Sep. 1983, Available online: <URL:https://www.ime.usp.br/~galves/cursos/Rissanen(1983).pdf> , 20 pages.

Ferragina et al., "Compressed Representation of Sequences and Full-Text Indexes", ACM Transactions on Algorithms, May 2007 Available online: <URL:https://doi.org/10.1145/1240233.12402432007>, 25 pages.

Abdel-Maguid et al., "Efficient Processing of Binary Shape Masks in the Compressed Domain Using Generalized Finite Transducers", in Proceedings of the Seventh International Symposium on Signal Processing and Its Applications, Jul. 4, 2003, 4 pages.

Hilewitz et al., "Fast Bit Compression and Expansion with Parallel Extract and Parallel Deposit Instructions"; International Conference on Application-Specific Systems, Architectures and Processors, Proceedings, Sep. 11-13, 2006, Available online: <DOI: 10.1109/ASAP.2006.33>, 8 pages.

(56) References Cited

OTHER PUBLICATIONS

Tang, L. "Methods for Encrypting and Decrypting Mpeg Video Data Efficiently", Multimedia '96: Proceedings of the Fourth ACM international Conference on Multimedia, Feb. 1997; Available online: <URL:https://doi.org/10.1145/244130.244209>, pp. 219-229.

Zhou et al., "Secure Lempel-Ziv-Welch (LZW) Algorithm with Random Dictionary Insertion and Permutation", 2008 IEEE International Conference on Multimedia and Expo Proceedings, Jun. 23-Aug. 26, 2008, pp. 245-248.

Yuan et al., "TripleBit: a Fast and Compact System for Large Scale RDF Data", Proceedings of the VLDB Endowment, vol. 6, No. 7, Available online: <URL:http://www.vldb.org/pvldb/vol6/p517-yuan.pdf>, May 2013, pp. 517-528.

Bowe, Alex, "Generating Binary Permutations in Popcount Order," <URL:https://alexbowe.com/popcount-permutations/>, May 9, 2011, 10 pages.

* cited by examiner

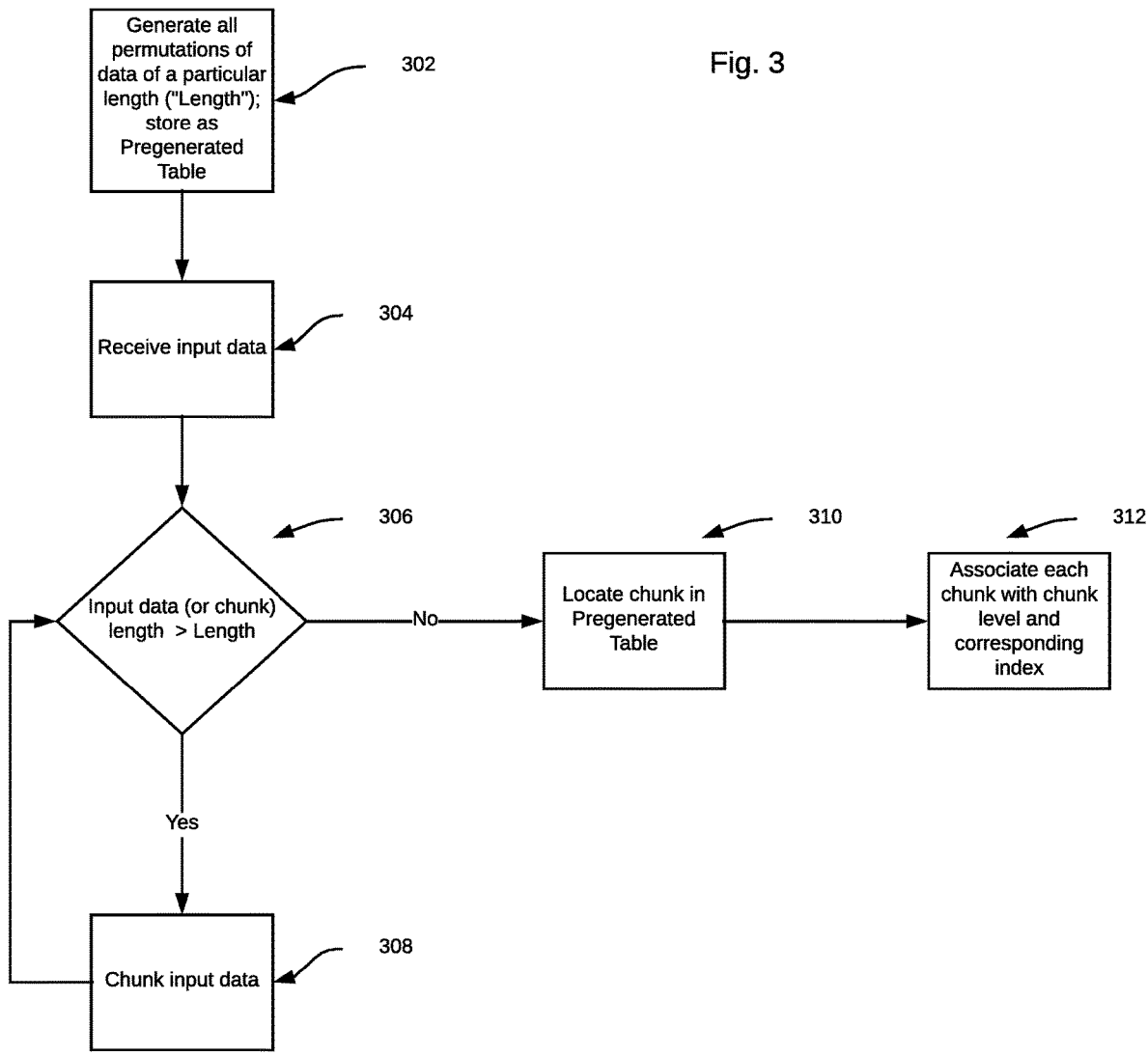

METHOD AND SYSTEM FOR CONTENT AGNOSTIC FILE INDEXING

CROSS REFERENCE TO RELATED APPLICATIONS

This application is a continuation-in-part of application Ser. No. 15/730,043, filed Oct. 11, 2017, entitled "Method and System for Content Agnostic File Indexing," the contents of which are fully incorporated by reference herein for all purposes.

COMPUTER PROGRAM LISTING—SEQUENCE LISTING

The following Computer Program Listing is submitted herewith and is incorporated by reference. Each of the respective files is incorporated by reference. The Computer Program Listing below is in the format of: <size in bytes> <date created> <file name>:

3864 May 16, 2018 squeeze-master-README-md.txt*
83675 May 16, 2018 squeeze-master-SqueezeReport-ipynb.txt*
4293 May 16, 2018 squeeze-master-demo_app-py.txt*
98 May 16, 2018 squeeze-master-gitignore.txt*
1383 May 16, 2018 squeeze-master-requirements.txt*
2490 May 16, 2018 squeeze-master-rpc_server-py.txt*
239 May 16, 2018 squeeze-master-scripts-buildprotos.txt*
942 May 16, 2018 squeeze-master-scripts-file_test-py.txt*
1391 May 16, 2018 squeeze-master-scripts-generate_key-py.txt*
711 May 16, 2018 squeeze-master-scripts-generate_key-set-py.txt*
629 May 16, 2018 squeeze-master-scripts-keys_from_folder-py.txt*
377 May 16, 2018 squeeze-master-scripts-lzw_test-py.txt*
107 May 16, 2018 squeeze-master-scripts-runserver.txt*
3928 May 16, 2018 squeeze-master-scripts-squeeze-bytes-report-py.txt*
63 May 16, 2018 squeeze-master-scripts-squeeze_file-py.txt*
1060 May 16, 2018 squeeze-master-scripts-squeeze_test-py.txt*
947 May 16, 2018 squeeze-master-scripts-string_test-py.txt*
222 May 16, 2018 squeeze-master-scripts-test_binary-py.txt*
1799 May 16, 2018 squeeze-master-scripts-test_rpc-py.txt*
2736 May 16, 2018 squeeze-master-scripts-time-squeeze-string-py.txt*
211 May 16, 2018 squeeze-master-scripts-time_keygen-py.txt*
65 May 16, 2018 squeeze-master-scripts-unsqueeze_file-py.txt*
80 May 16, 2018 squeeze-master-setup-py.txt*
10657 May 16, 2018 squeeze-master-squeeze-_init_-py.txt*
2783 May 16, 2018 squeeze-master-squeeze-bitstring-py.txt*
9191 May 16, 2018 squeeze-master-squeeze-keys-py.txt*
613 May 16, 2018 squeeze-master-squeeze-performance-csv.txt*
22445 May 16, 2018 squeeze-master-squeeze-squeeze_pb2-py.txt*
2232 May 16, 2018 squeeze-master-squeeze-squeeze_pb2_grpc-py.txt*
3366 May 16, 2018 squeeze-master-squeeze-proto.txt*
875 May 16, 2018 squeeze-master-templates-layout-html.txt*
816 May 16, 2018 squeeze-master-templates-upload_form-html.txt*
1513 May 16, 2018 squeeze-master-templates-uploaded_file-html.txt*
200 May 16, 2018 squeezerpc-master-Makefile.txt*
1131 May 16, 2018 squeezerpc-master-README-md.txt*
7 May 16, 2018 squeezerpc-master-gitignore.txt*
8995 May 16, 2018 squeezerpc-master-main-go.txt*
21292 May 16, 2018 squeezerpc-master-squeeze-squeeze-pb-go.txt*
3366 May 16, 2018 squeezerpc-master-squeeze-proto.txt*

TECHNICAL FIELD

This disclosure relates to a method for content agnostic file referencing. The method may further relate to a method for content agnostic data compression.

BACKGROUND OF THE INVENTION

File referencing techniques generally require knowledge about the kind of data being stored in order to efficiently index the data in a file referencing system. Similarly, knowledge about the data at issue is also generally used in creating improved compression approaches to reduce data size for transmission, storage, and the like.

There exists a need in the industry to improve file referencing and data compression techniques to reduce the amount of data that must be stored and/or transmitted.

SUMMARY OF THE INVENTION

According to one embodiment, this disclosure provides a method for improving computing technology with an enhanced content-agnostic file referencing system. The method improves the operation of the computer itself.

The disclosed method has several important advantages. For example, the disclosed method permits file referencing of any content type.

The disclosed method additionally permits a significant reduction in the amount of information or data that must be persisted or transmitted, as data may be generated at access time as opposed to persisted.

Various embodiments of the present disclosure may have none, some, or all of these advantages. Other technical advantages of the present disclosure may also be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which:

FIG. 3 is a flowchart outlining the steps of an alternate embodiment of the present disclosure.

Similar reference numerals refer to similar parts or steps throughout the several views of the drawings.

DETAILED DESCRIPTION OF THE EMBODIMENTS

The present disclosure relates to a method for content-agnostic indexing of data. The method may be used for a variety of computer-specific needs, including for example as a file referencing system or a compression system.

The disclosure below describes the invention in connection with compression of binary data as exemplary, but the teachings work as well with any type of data, better termed "n-ary" data. For example, the method and system also works with qubits and bits.

Figure 1:
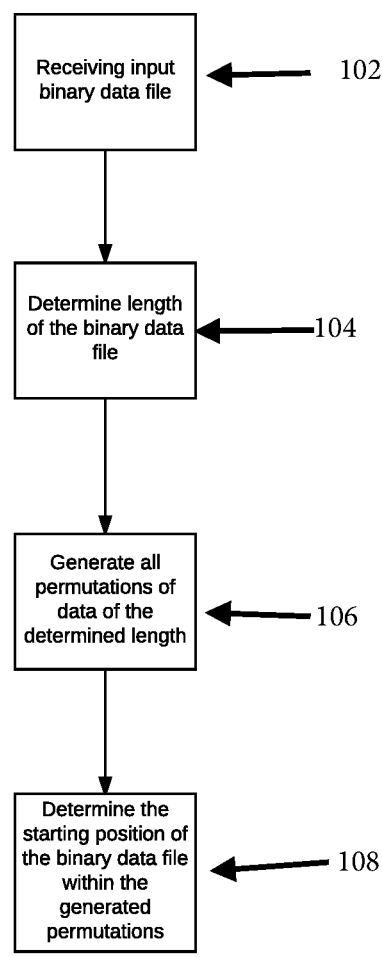
FIG. 1 is a flowchart outlining the steps of one embodiment of the present disclosure.

One embodiment of the present invention comprises a method as described in the flow chart depicted in FIG. 1. Binary data ($n_i$) (for instance, a data file) to be persisted or transmitted is analyzed to determine its length in bits ($l(n_i)$). Using this information, at step 106, the method calculates all permutations of data of the identified length. For example, if the input data is:

01 then the input data is 2-bits long. At step 106, all permutations of 2-bits will be generated, namely:

{00} {01} {10} {11}

At step 108, the method determines the index ($n_f$) of the input binary data file in the generated permutations. Using the example above, the index ($n_f$) returned would be "1". Finally, rather than storing or transmitting the input binary data (i.e. "01"), the system instead stores the length (2) and the index (1).

Figure 2:
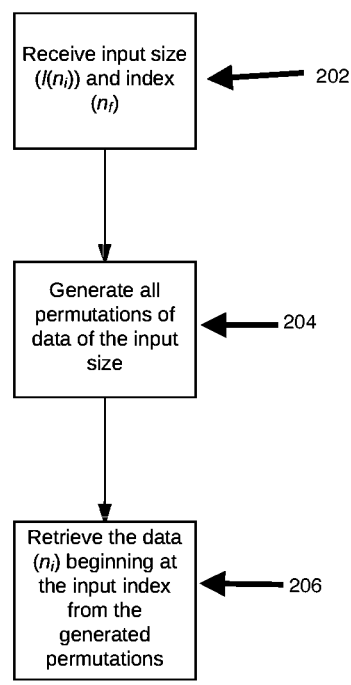
FIG. 2 is another flowchart outlining the steps of another embodiment of the present disclosure.

When the need comes to decode the original input data (for instance, a request to retrieve the original binary data from disk, or receipt of the transmitted data across a network), the method needs only a length ($l(n_i)$) and an index ($n_f$) as input. Using the above example, the input provided would be the length (2) and the index (1). As shown in FIG. 2, the system calculates all permutations of the inputted length. As above, that would generate the following permutations:

{00} {01} {10} {11}

The system would then go to the provided index (1 in the above example) and return the permutation. Again, using the above example, this would return "01" the original binary data.

The above method has been described for purposes of example in terms of a binary system (i.e. the input data is binary data). The method and system work similarly for n-ary systems. While the binary system describes above works essentially in the Euclidean plane, with n-ary data Hilbert spaces conceptually provide the same advantages. The method and process can be generalized for n-ary data per below:

$d\hat{\ }n=p(i)$ $(d\hat{\ }n)n=p(f)$ d=order of the system n=length in appropriate n-ary units respective to the order of the system p(i)=initial index p(f)=final index

| Order of System (d) | Visual Representation | Reference Key | Search Pattern |
|---|---|---|---|
| 1 | String | n/x | Left to Right |
| 2 | Plane | n/x/y | Top Left to Bottom Right |
| 3 | 3(fold) | n/x/y/z | Top Back Left to Bottom Front Right |
| D | D(fold) | n/x/y/z/... | Top Back Left . . . to Bottom Front Right . . . |

It should be noted that given two alternative ordered systems with the same input file, the system with the higher order will have a higher n-ary density relative to the alternative with a lesser ordered system.

An example of the method is disclosed in the following Ruby code snippets. The below snippet demonstrates a method as disclosed in FIG. 1:

```
class Input
    require 'securerandom'
    def create(k)
        input_binary = SecureRandom.hex(k)
    end
    def clean(k)
        input_string = create(k).unpack('B*').first.to_s
    end
    def build(n)
    permutation = (0..2**n-1).map { |i| "%0#{n}b" % i }
    end
    def self.kmp_search(string, substring)
        return nil if string.nil? or substring.nil?
        pos = 2
        cnd = 0
        failure_table = [-1, 0]
        while pos < substring.length
        if substring[pos - 1] == substring[cnd]
            failure_table[pos] = cnd + 1
            pos += 1
            cnd += 1
        elsif cnd > 0
            cnd = failure_table[cnd]
        else
            failure_table[pos] = 0
            pos += 1
        end
        end
        m = i = 0
        while m + i < string.length
            if substring[i] == string[m + i]
            i += 1
            return m if i == substring.length
            else
                m = m + i - failure_table[i]
                i = failure_table[i] if i > 0
            end
        end
        return nil
    end
    def kmp_search(substring)
        Input.kmp_search(self, substring)
    end
end
init    = Input.new
input   = init.clean(1)
depth   = input.length
generate    = init.build(depth)
steps   = generate.join.to_s
step    = Input.kmp_search("#{steps}" ,"#{input}")
p input
p depth
p step
```

The below snippet demonstrates a method as disclosed in FIG. 2, using an input length ($l(n_i)$) of 16 and an index ($n_j$) of 72,629:

```
class Output
  def build(n)
    permutation = (0..2**n-1).map { |i| "%0#{n}b" % i }
  end
end
depth      = 16
step       = 72629
init       = Output.new
create     = init.build(depth)
interpret  = create.join.to__s
compute    = (depth + step) - 1
output     = interpret[step..compute].gsub(/\s\w+$/,'...')
p output
```

In a preferred embodiment, an input byte string is converted into a bit string corresponding to a representation of the input byte string. This bit string is what is then processed through the method described herein.

In an alternative embodiment, rather than generate the table based on the length of the data, a table may be pregenerated with all permuations of data of a particular length. This pregenerated table may be persisted in memory, either non-volatile or volatile memory. Using the above example, if the predetermined length is 2-bits, the pregenerated table will include all permutations of 2-bit data, such as

{00} {01} {10} {11}

In one embodiment, this table may be stored in an array with corresponding indices as follows:

| {00} | {01} | {10} | {11} |
|------|------|------|------|
| 0    | 1    | 2    | 3    |

This pregenerated table may be stored on disk, in RAM, or otherwise. Preferably, this pregenerated table is stored with the computing system that reduces file size (or squeezes a file) as well as the computing system that expands a reduced file (or unsqueezes the data).

Upon receiving input data, the method "chunks" the data into smaller subsets of data. In the context used herein, "chunk" means to take a data string and create smaller data strings comprising subsets of the larger data string. All chunks together would form the original data string. For example, if the input data is:

011001110001

It may be chunked into 4-bit chunks as follows:

0110 0111 0001

Each individual chunk will then be compared to the pregenerated table to see if there is a match. Using the above example, with chunk sizes of 4-bits, each chunk will not be found in the table as the table has permutations for all 2-bit chunks. Thus, each chunk will be chunked again, resulting in the following:

01 10 01 11 00 01

The method will continue for each chunk until a point where the particular chunk is located in the pregenerated table. At that point, the chunk will be associated with its respective index, and preferably a series of tuples will be generated indicating the chunk level and the corresponding index. In the above example, the system chunked twice, so the index association will be as follows:

{2, 1} {2, 2} {2, 1} {2, 3} {2, 0} {2, 1}

In this example, the original input data "011001110001" was eventually broken into six (6) chunks, each of 2-bit length. As shown, each chunk is represented with a chunk level (2) and corresponding index into the pregenerated table.

The data may be chunked in any number of ways. For instance, the data may be chunked based on a pre-determined size as in the above example (where the predetermined size was 4-bits for purposes of example). Alternatively, the input data may be recursively chunked into 2 separate data chunks, until each data chunk may be found in the pregenerated table. Using the same input data as above, a method of chunking the data by splitting it would result in the following first level chunk:

011001 110001

Here, the data sets are not found in the pregenerated table, so they are chunked again:

011 001 110 001

Again, the chunked data is not found in the pregenerated table, so it must be chunked again:

00 1 00 1 11 0 00 1

Notably, some segments are chunked into data smaller than the pregenerated table size (i.e. segments "1", "1", "0", and "1"). These segments may be padded in order to compare them to the pregenerated table. The numbers may be stored either using big endian or little endian byte order, so long as consistency is maintained. Using big endian byte order, for example, the chunked data above would be represented as:

00 10 00 10 11 00 00 10

The method would then continue as it did above.

It is not required that all chunks of data be found in the pregenerated table at the same data chunk level. For example, using the above pregenerated table for 2-bit combinations, if the input data is:

0110011100

The data may be originally chunked like above, by breaking it into 4 bit sequences:

0110 0111 00

Like above, the first two 4-bit sequences (i.e. "0110" and "0111") must be chunked again into smaller chunks in order to be located in the pregenerated table, resulting in the following chunks:

01 10 01 11 00

And as above, the chunks will be associated with their chunk level and corresponding index as follows:

{2, 1} {2, 2} {2, 1} {2, 3} {1, 0}

Note the last tuple above indicates a chunk level of 1, as that chunk did not require a second round of chunking.

Once the input data is reduced to a series of chunk levels and indices, that series of chunk level and indices is used to identify the original data. The association may be stored as a series of tuples, as a separate bit string, and otherwise.

To recreate (or unsqueeze) the data based on a series of chunk levels and indices, the process works in reverse. Again, the system must have the same pregenerated table. For each tuple of chunk level and index, the system consults the pregenerated table to unpack the squeezed chunk and return it to its original data.

This alternate embodiment is shown in the flowchart of FIG. 3. First, a Pregenerated Table comprising all permutations of data of a particular length is created at step 302. As indicated above, preferably that table is persisted in some fashion. Next, the system receives input data to be squeezed at step 304. The process then chunks the data into smaller segments until the data length is of a length that would be located in the Pregenerated Table at steps 306 and 308. As indicated above, the process maintains the chunk level so that the system knows how many times an input data set has been chunked. Each chunk is then located in the Pregenerated Table at step 310. Finally, the chunk, its chunk level, and the respective index in the Pregerated Table is associated, resulting in the squeezed data at step 312.

Although this disclosure has been described in terms of certain embodiments and generally associated methods, alterations and permutations of these embodiments and methods will be apparent to those skilled in the art. Accordingly, the above description of example embodiments does not constrain this disclosure. Other changes, substitutions, and alterations are also possible without departing from the spirit and scope of this disclosure.

What is claimed is:

1. A computer-implemented method for content-agnostic referencing of a binary data file, the method comprising:
    pregenerating a table using an input seed wherein the table comprises all permutations of bits of a predetermined length;
    determining a length of the binary data file, the length comprising the number of bits of the binary data file;
    chunking the binary data file into substrings wherein each substring is of a length smaller than the length of the binary data file;
    for each chunk of the binary data file, determining if the chunk is in the pregenerated table, wherein if the chunk is in the pregenerated table, associating the chunk with an index of the location of the chunk in the pregenerated table, and wherein if the chunk is not in the pregenerated table, further chunking the chunked binary data into smaller chunks; and
    using the number of chunks and associated indices of all chunks to indicate the binary data file.

2. The method of claim 1, wherein using the number of chunks and associated indices of all chunks to indicate the binary data file comprises:
    persisting on a storage device the number of chunks and associated indices of all chunks instead of the binary data file.

3. The method of claim 1, using the number of chunks and associated indices of all chunks to indicate the binary data file comprises:
    transmitting the number of chunks and associated indices of all chunks instead of the data file.

4. The method of claim 3 wherein transmitting transmits the number of chunks and associated indices of all chunks on a network.

5. The method of claim 3 wherein transmitting transmits the number of chunks and associated indices of all chunks on a bus.

6. The method of claim 1 wherein using the number of chunks and associated indices of all chunks to indicate the binary data file comprises:
    creating a tuple of ordered pairs wherein each ordered pair indicates a chunk level and an associated index.

7. The method of claim 1 wherein using the number of chunks and associated indices of all chunks to indicate the binary data file comprises persisting the number of chunks and associated indices of all chunks on a storage device.

8. The method of claim 7 wherein the storage device is a disk.

9. The method of claim 1 wherein the pregenerated table is a hash table.

10. The method of claim 1 wherein the pregenerated table is an array.

11. The method of claim 1 wherein the pregenerated table is persisted in volatile memory.

12. The method of claim 1 wherein the pregenerated table is persisted in non-volatile memory.

13. The method of claim 1 wherein chunking the binary data file into substrings further comprises:
    chunking the binary data into chunks of a predetermined length.

14. The method of claim 13 wherein the predetermined length is 2 megabytes.

15. The method of claim 13 wherein the predetermined length is smaller than 2 megabytes.

16. The method of claim 13 wherein the predetermined length is larger than 2 megabytes.

17. The method of claim 1 wherein chunking the binary data file into substrings further comprises:
    recursively splitting the binary data file into 2 chunks.

18. The method of claim 17, wherein the 2 chunks are padded to be equal size.

19. The method of claim 1, wherein using the number of chunks and associated indices of all chunks to indicate the binary data file comprises storing an association of a chunk level and an associated index as a series of tuples.

20. The method of claim 1, wherein using the number of chunks and associated indices of all chunks to indicate the binary data file comprises storing an association of a chunk level and an associated index as a separate bit string.

* * * * *